(12) United States Patent
Ballou et al.

(10) Patent No.: US 10,955,594 B2
(45) Date of Patent: Mar. 23, 2021

(54) ENHANCED, DURABLE SILVER COATING STACKS FOR HIGHLY REFLECTIVE MIRRORS

(71) Applicant: Corning Incorporated, Corning, NY (US)

(72) Inventors: Jason S Ballou, Gilsum, NH (US); Frederick J Gagliardi, Jaffrey, NH (US); Gary Allen Hart, Walworth, NY (US); Timothy R Soucy, Brattleboro, VT (US); Robin Merchant Walton, Redwood City, CA (US); Leonard Gerard Wamboldt, Sunderland, MA (US); Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 314 days.

(21) Appl. No.: 15/916,630

(22) Filed: Mar. 9, 2018

(65) Prior Publication Data

US 2018/0259688 A1    Sep. 13, 2018

Related U.S. Application Data

(63) Continuation of application No. 15/265,941, filed on Sep. 15, 2016, now Pat. No. 9,995,860, which is a (Continued)

(51) Int. Cl.
*G02B 5/08* (2006.01)
*G02B 1/14* (2015.01)

(52) U.S. Cl.
CPC ............. *G02B 5/0858* (2013.01); *G02B 1/14* (2015.01); *G02B 5/0808* (2013.01); *G02B 5/0816* (2013.01)

(58) Field of Classification Search
CPC ...... G02B 5/0808; G02B 1/14; G02B 5/0816; G02B 5/0858
(Continued)

(56) References Cited

U.S. PATENT DOCUMENTS

| 3,601,471 A | 8/1971 | Seddon |
| 4,223,974 A | 9/1980 | Masso |

(Continued)

FOREIGN PATENT DOCUMENTS

| EP | 2284135 A2 | 2/2011 |
| JP | 2003329818 A | 11/2003 |

(Continued)

OTHER PUBLICATIONS

Chu et al; "Corrosion Characterization of Durable Silver Coatings by Electrochemical Impedance Spectroscopy and Accelerated Environmental Testing"; Applied Optics; vol. 45, No. 7, Mar. 1, 2006, pp. 1583-1593.

(Continued)

*Primary Examiner* — Elizabeth A Burkhart
(74) *Attorney, Agent, or Firm* — Amy T. Lang; Kevin L. Bray

(57) ABSTRACT

The disclosure is directed to a highly reflective multiband mirror that is reflective in the VIS-NIR-SWIR-MWIR-LWIR bands, the mirror being a complete thin film stack that consists of a plurality of layers on a selected substrate. In order from substrate to the final layer, the mirror consists of (a) substrate, (b) barrier layer, (c) first interface layer, (d) a reflective layer, (e) a second interface layer, (f) tuning layer(s) and (g) a protective layer. In some embodiments the tuning layer and the protective layer are combined into a single layer using a single coating material. The multiband mirror is more durable than existing mirrors on light weight metal substrates, for example 6061-Al, designed for similar (Continued)

applications. In each of the five layer types methods and materials are used to process each layer so as to achieve the desired layer characteristics, which aid to enhancing the durability performance of the stack.

8 Claims, 11 Drawing Sheets

Related U.S. Application Data continuation of application No. 13/834,230, filed on Mar. 15, 2013, now Pat. No. 9,488,760.

(60) Provisional application No. 61/770,548, filed on Feb. 28, 2013.

(58) Field of Classification Search
USPC .......................................................... 427/164
See application file for complete search history.

(56) References Cited

U.S. PATENT DOCUMENTS

| | | | |
|---|---|---|---|
| 4,710,283 A | 12/1987 | Signh et al. | |
| 4,963,012 A | 10/1990 | Tracy et al. | |
| 5,019,458 A | 8/1991 | Elgat et al. | |
| 5,424,876 A | 6/1995 | Fujii | |
| 5,548,440 A | 8/1996 | Hohenegger et al. | |
| 5,751,474 A | 5/1998 | Hohenegger et al. | |
| 5,851,365 A | 12/1998 | Scobey | |
| 6,078,425 A | 6/2000 | Wolfe et al. | |
| 6,128,126 A | 10/2000 | Hohenegger | |
| 6,839,176 B2 | 1/2005 | Buchsbaum et al. | |
| 6,921,177 B2 | 7/2005 | Schaefer | |
| 7,054,065 B2 | 5/2006 | Wolfe et al. | |
| 7,242,843 B2 | 7/2007 | Clar et al. | |
| 7,621,648 B2 | 11/2009 | Wuillaume et al. | |
| 7,838,134 B2 | 11/2010 | Wolfe | |
| 7,889,623 B2 | 2/2011 | Iida et al. | |
| 8,828,526 B2 | 9/2014 | Ballou et al. | |
| 9,488,760 B2 * | 11/2016 | Ballou ................ | G02B 5/0858 |
| 9,995,860 B2 * | 6/2018 | Ballou ................ | G02B 5/0858 |
| 2004/0169944 A1 | 9/2004 | Sawamura et al. | |
| 2006/0141272 A1 * | 6/2006 | Wolfe .................. | G02B 5/0858 428/457 |
| 2007/0026319 A1 | 2/2007 | Nagate et al. | |
| 2010/0086775 A1 * | 4/2010 | Lairson .................... | F21V 7/24 428/336 |
| 2011/0049546 A1 * | 3/2011 | Heikman .............. | H01L 33/387 257/98 |
| 2011/0064967 A1 | 3/2011 | Stachowiak | |
| 2012/0128954 A1 * | 5/2012 | Ballou ................ | C23C 14/0641 428/216 |
| 2015/0285958 A1 | 10/2015 | Comstock, II et al. | |

FOREIGN PATENT DOCUMENTS

| | | |
|---|---|---|
| JP | 2007072190 A | 3/2007 |
| WO | 2011120595 A1 | 10/2011 |

OTHER PUBLICATIONS

Feng et al; "Ab Initio Study of Ag/Al2O3 and Au/Al2O3 Interfaces"; Physical Review B; 72; (2005); 115423 pp. 115423-1-115423-11.
Graedel; "Corrosion Mechanisms for Silver Exposed to the Atmosphere"; J. Electrochem. Soc., vol. 139, No. 7; Jul. 1992; pp. 1963-1970.
Hwangbo et al; "Ion Assisted Deposition of Thermally Evaporated Ag and Al Films"; Applied Optics; vol. 28, No. 14, Jul. 15, 1989; pp. 2769-2778.
Jung; "Study on Texture Evolution and Properties of Silver Thin Films Prepared by Sputtering Deposition"; Applied Surface Sciecne; 221 (2004) pp. 281-287.
Kovalenko et al; "Thickness Dependences of Optical Constants for Thin Layers of Some Metals and Semiconductors"; Semiconductor Physics, Quantum Electronics & Optoelectronics, 2001, vol. 4, No. 4 pp. 352-359.
Lee et al; "Ion-Assisted Deposition of Silver Thin Films"; Thin Solid Films, 359 (2000) 95-97.
Liang et al; "Effects of Sodium Chloride Particles, Ozone, UV, and Relative Humidity on Atmospheric Corrosion of Silver"; Journal of the Electrochemical Society, 157 (4) 2010; pp. C146-C156.
Sheikh et al; "Durable Silver Coating for Kepler Space Telescope Primary Mirror"; Proc. of SPIE, vol. 7010; 2008; pp. 70104E-1-70104E-5.
Stevenson et al; "X-1 Silver: A High Durability Silver Coating for Use in Harsh Environments"; Society of Vacuum Coaters, 505/856-7188; 2000; 1 Page.
Thomas et al; "Protected Silver Coatings for Flashlamp-Pumped ND: Glass Amplifiers"; SPIE vol. 3578, 1998; pp. 730-736.
Vucina et al; "Geminis Protected Silver Coatings: First Two Years in Operation"; Proc. of SPIE, vol. 6273; 2006; 62730W-1-62730W-10.
Zhang et al; "Nonstoichiometric Interfaces and Al2O3 Adhesion With Al and Ag"; Physical Review Letters; vol. 85, No. 15, Oct. 2000; pp. 3225-3228.

* cited by examiner

Ag-Cr-Si3N4 4hr SF    Ag-Ni-Si3N4 6hr SF

ENHANCED, DURABLE SILVER COATING STACKS FOR HIGHLY REFLECTIVE MIRRORS This application is a continuation of U.S. patent application Ser. No. 15/265,941, filed on Sep. 15, 2016, which is a continuation of U.S. patent application Ser. No. 13/834,230, filed Mar. 15, 2013, which claims the benefit of priority under 35 U.S.C. § 119 of U.S. Provisional Application Ser. No. 61/770,548 filed on Feb. 28, 2013, the contents of which are relied upon and incorporated herein by reference in their entirety.

FIELD

The disclosure is directed to Enhanced, Durable Innovative Silver-containing ("EDIS") coating stacks for highly reflective mirrors, and to a method of making such stacks, for use in ISR detectors.

BACKGROUND

There have been constant improvements in Intelligence-Surveillance-Reconnaissance (ISR) detector technology, for example, increasing the wavelength detection range, decreasing detector footprint and reducing pixel size, all of which enable the system size and weight to be reduced. These improvements created an increased demand for ISR broad-multi-band optical systems; specifically including a high definition visible band (VIS, 0.34 μm to ~0.75 μm) as well as the near infrared (NIR, 0.75 μm to 1.4 μm), the short wavelength infrared (SWIR, 1.4 μm to 3 μm), the mid-wavelength infrared (MWIR, 3 μm to 8 μm), and long wavelength infrared (LWIR, 8 μm to 15 μm) bands. A key component of such systems is reflective optics that have a silver coating thereon which enables the systems to achieve this spectral performance. However, historically the silver coatings have been a source of system failures due to the propensity of the silver coating to "break-down" or "corrode" over time. It may not be possible to completely protect future systems from some of the harsh environments in which they will operate, particularly environments that are hot, humid and contain salt. It is thus desirable to have a system having highly durable broad band silver coated optics.

There are several test procedures that are used to evaluate the durability performance of thin film coated optical components. Examples include military specification documents such as MIL-C-48497, MIL-F-48616 and MIL-PRF-13830B, which include tests that involve exposure to humidity, salt fog, salt solutions, temperature cycling, abrasion, and other test procedures. The harshest of these tests is the "24-hour salt fog" test. While at the present time there are two groups that claim highly reflective mirror stacks, made by specific processes, that can pass the 24-hour salt fog test (Quantum Coating Inc. using a Denton Vacuum process (not described) and Lawrence Livermore Laboratories using a process described in U.S. Pat. No. 7,838,134), neither of these stacks meet the entire ISR spectral requirements, specifically they do not meet them for the LWIR range. The Quantum/Denton silver coating is called "X-1 Silver" by both parties; and the published information shows performance in the 0.4 μm to 0.7 μm range (2000 Society of Vacuum, Coaters 505/856-7188; $43^{rd}$ Annual Technical Conference Proceedings (2000) ISSN 0737-5921), with no information for longer wavelengths into the infrared out to the LWIR range being given for this coating. This article also suggests the use of ion beam assisted deposition and substrate heating might further improve performance. However, substrate heating is not desirable when using some metallic substrates, for example 6061-Al substrates, because if the temperature is too high the mechanical strength and corrosion resistance of the substrate is decreased. Consequently, it is preferred that the substrate temperature be below the heat treating (~415° C.) and stress relief (~350° C.) temperatures of the 6061-Al substrates. Lawrence Livermore Laboratories, U.S. Pat. No. 7,838,134, claims the use of nitrides for the silver adhesion-interface layers while using a $Si_3N_4$ protective cap layer. The patent states that the "silver mirror is characterized by high reflectance in a broad spectral range of 300 nm in the UV to the far infrared (~10000 nm)", this range being 0.3 μm to 10 μm.

However, despite the advances made in the art, further extension of the silver mirror's reflectance properties, including the wavelength range into the LWIR and mirror durability, is desirable.

SUMMARY

The disclosure is directed to a highly reflective multiband mirror that is reflective in the VIS-NIR-SWIR-MWIR-LWIR bands, the mirror being a complete thin film stack that consists of six (6) types of layers on a substrate. The multiband mirror is more durable than existing mirrors on light weight metal substrates, for example 6061-Al, designed for similar applications. In each of the layer types, methods and materials are used to process each layer so as to achieve the desired layer characteristics, which aid to enhancing the durability performance of the stack. While any given layer may improve stack durability, it is the combination of these five layer types that results in the higher, enhanced level of performance exhibited by the mirror of this disclosure. Table 1 illustrates these 5 types of layers, which are a barrier layer, at least one interface layer, a reflective layer, a tuning layer and a protective layer, and defines their properties. Multiple materials can be used to meet the characteristics needed for each of the different layer types.

TABLE 1

Coating Design and Materials

| Layer | Layer Characteristics | Exemplary Materials |
| --- | --- | --- |
| Protective Layer(s) | The layer possesses a high level of both chemical and mechanical durability | $YbF_3$, $YF_3$, $Si_3N_4$, $Yb_xF_yO_z$ |
| Tuning Layer(s) | A low refractive index, high refractive index design is used for layer tuning. The materials must be low absorbing in the wavelength range of from 0.4 μm to 15.0 μm, and possess a medium to high level of chemical and mechanical durability. | $YbF_3$, $YF_3$, $GdF_3$, $Bi_2O_3Yb_xF_yO_z$, $Bi_2O_3$, ZnS |

TABLE 1-continued

Coating Design and Materials

| Layer | Layer Characteristics | Exemplary Materials |
|---|---|---|
| Second Interface Layer (2$^{nd}$ layer) | This layer is used to promote adhesion of the tuning layers to the reflective layer, must have low absorption and be galvanically compatible with the reflective layer | $Bi_2O_3$, ZnS, $Nb_2O_5$, $TiO_2$, $Ta_2O_5$, $Al_2O_3$ |
| Reflective Layer | Silver (Ag) is used as the reflective layer to provide high reflectance (high % R) in the wavelength range of layer possesses a high level of both chemical and mechanical durability | Ag, Au, Al, Rh, Cu, Pt, Ni |
| First Interface Layer (1st Layer) | This interface layer is used to promote adhesion between the barrier layer and the reflectance layer, and must have galvanic compatibility with the barrier and reflective layers. | $Al_2O_3$, $TiO_2$, $Bi_2O_3$ ZnS, Ni, Bi, Monel (Ni—Cu), Ti, Pt |
| Barrier Layer | This layer is used to create galvanic compatibility between the Ag reflective layer (0.15 V) and the Al substrate (0.9 V). While Al and CrN can be barrier layers, an interface layer is needed to achieve galvanic compatibility with the reflective layer. | $Si_3N_4$, $SiO_2$, TiAlN, TiAlSiN, $TiO_2$, DLC, Al, CrN, $Si_xN_yO_z$ |
| Substrate | A light weight diamond turned optic/substrate, for example 6061 aluminum (6061-Al) and other Al alloys, Mg alloys, Ti Alloys and ceramic alloys. A barrier layer is needed for metal alloys and its thickness is substrate dependent. | silica, fused silica and F-doped fused; and 6061-Al alloy, other light weight Al alloys Mg alloys, Ti alloys |

1. The interface layers are also referred to as "adhesion" layers.
2. $Yb_xF_yO_z$ is formed when oxygen is admitted during the depositions of $YbF_3$.
Electronically, $nYb^{+3} = yF^{-1} + zO^{-2}$ so that the sum of the positive and the negative valances balance and there is no net charge to the coating layer. The same is true for $Si_xN_yO_z$.

Thus, in order from substrate to the final layer, the mirror consists of (a) substrate, (b) barrier layer, (c) first interface layer, (d) reflective layer, (e) second interface layer, (f) tuning layer and (g) protective layer. In some embodiments, the tuning layer and the protective are combined into a single layer using a single coating material.

Barrier Layer

The thickness of the barrier layer can be in the range of 100 nm to 50 µm. In one embodiment, the barrier layer has a thickness in the range of 500 nm to 10 µm. In another embodiment, the barrier layer has a thickness in the range of 1 µm to 5 µm. One criterion for determining the thickness of the barrier is the number of hours the article will have to withstand the salt fog test. The longer the duration of the salt fog test the thicker the barrier layer. For a salt fog test of 24 hours a barrier layer of 10 µm has been found sufficient. In many applications, if the barrier layer is too thick it will cause distortion of the finished part with changes in temperature, but since typically the operational temperature is given in the specification the thickness of the barrier layer can be adjusted to prevent distortion. The differences in the thermal expansion coefficients of the barrier layer and the substrate will cause the optical figure, power and irregularity, to change ΔT (the change in temperature). In some embodiments, the barrier layer is sufficiently thick so that it will cover or smooth out any high and irregular substrate peak-to-valley variations. Smoothing out such variations aids in polishing the surface to optimize surface quality. The surface quality is important in promoting adhesion on entire surface and minimizing localized defect sites that may be caused by the peak-to-valley variations.

The First and Second Interface Layers, also known as "Adhesion Layers"

The thickness of these layers is dependent of factors including the material used for the layers, whether the layer is the 1$^{st}$ or 2$^{nd}$ interface or adhesion layer, and whether it is on the front surface (the surface of the reflecting layer) or back surface (the layer on which the reflecting layer is deposited) of the mirror. When Ni, Cr and Ti materials are used as the interface layer only a thin layer of material, on the order of angstroms "Å", is used. For a front surface mirror the interface layer on top of the reflecting layer, that is, the second interface layer, needs to be thick enough to promote adhesion, but also thin enough so that it does not absorb any of the reflected radiation. In general, the thickness of the first interface layer is in the range of 2 Å to 250 Å (0.2 nm to 25 nm). For metallic interface layers, for example Ni and Cr, the thickness is in the range of 2 Å to <25 Å (0.2 nm to <2.5 nm). In one embodiment the metallic first interface layer thickness is in the range of 2 Å to 10 Å (0.2 nm to 1 nm). When a metal oxide or sulfide, for example $Al_2O_3$ or ZnS, is used as the first interface layer the thickness is greater than 25 Å (>2.5 nm). In an embodiment the first interface layer is a metal oxide or sulfide the thickness is in the range of 50 Å to 250 Å (5 nm to 25 nm). In another embodiment the first interface layer thickness is in the range of 10 nm to 20 nm.

The interface-adhesion layer used under the reflective layer, that is, the first interface layer, is present only to promote adhesion so that optical considerations such as absorbing reflection radiation is not a consideration. Consequently, the thickness of the first interface or adhesion layer is determined based on adhesion and not optical considerations. As a result, the first interface layer can have a minimum thickness to provide the adhesion, but no maximum thickness because there are no absorption or optical concerns. However, the thickness of the second interface layer has to be carefully controlled so the reflection losses are minimized. For the second interface layer the thickness is in the range of 5 nm to 20 nm. In an embodiment the thickness of the second interface layer is in the range of 8 nm to 15 nm. In another embodiment where reflective article is intended for use in the wavelength range of 9.5 µm to 15 µm, the thickness of the second interface layer is in the range of 8 µm to 12 µm to maximize the reflectance of the final reflective article.

Reflective Layer

For the reflective metal layer the thickness must be sufficient to provide optimum reflection properties. If the reflective layer is too thin the film is not continuous and/or transmitting and if it is too thick this can create durability concerns. The thickness of the reflective layer is in the range of 75 nm to 350 nm. In an embodiment the thickness of the reflective layer is in the range of 80 nm to 150 nm. In another embodiment the thickness of the reflective layer is in the range of 90 nm to 120 nm.

In addition to using Ag as the reflective material, the stack configuration can also be used with other reflective materials, for example Au, Al, Rh, Cu, Pt, Ni, to provide an enhanced durable, chemical and mechanical performance, but with a change in spectral range and reflection intensity.

Tuning and Protective Layers:

The thicknesses of these layers depend on the optimization necessary to achieve the required spectral performance while simultaneously optimizing the protection necessary to pass the required tests, for example, the salt fog and humidity tests. The thickness of these layers can vary significantly depending on application and materials used.

An Ag mirror prepared using the scheme and materials described in Table 1 will have the following advantages 1-7.
1. It will meet a high reflectivity specification in all desired wavelength bands, VIS-NIR-SWIR-MWIR-LWIR, for angle on incidence (AOI) of 0 to 45 degrees and in some cases >45 degrees. The materials and thicknesses used to prepare an Ag mirror as described herein has resulted in minimum absorption in LWIR region where other stacks and prior art have absorption issues. The materials used in the present disclosure include $YbF_3$, $YF_3$, ZnS, $Bi_2O_3$, $GdF_3$ that have no absorption bands in the defined LWIR band, 8 μm to 15 μm.
2. $YbF_3$ and $YF_3$ have demonstrated high resistance to the salt fog environment and pass specification moderate abrasion tests, so they are alternative materials that can be used as a protective cap layer
3. The $Al_2O_3$, $Bi_2O_3$, ZnS and $TiO_2$ transparent materials, used as an interface-adhesion layer, can be thicker on the front end interface; thus it is easier to control layer termination during the deposition process compared to ultra-thin layers of Cr or Ni, or related alloys. These materials, $Al_2O_3$, ZnS and $TiO_2$, have considerably less absorption in all bands compared to the metals typically used for this purpose, for example, Ni and Cr.
4. Replacing a metal and/or conductive interface-adhesion layer with non-conductive materials results in ideal galvanic compatibility.
5. Replacing a metal and/or conductive barrier layer with dielectric material results in ideal galvanic compatibility.
6. Thick barrier layers have increased overall stack resistance to salt fog and extended humidity environments. Materials successfully used in achieving this resistance are $Si_3N_4$, $SiO_2$, $Si_xN_yO_z$, DLC (diamond-like carbon), $TiO_2$, CrN, $Si_xN_yO_z$, TiAlN or TiAlSiN or similar composite films. In addition, if needed to optimize galvanic compatibility, an optional multi-layer barrier could be configured and applied as a non-conducting layer at the metal/substrate surface with the addition of a thicker conductive layer, for example, $SiO_2$—CrN. For example, CrN is a very good barrier layer because of its resistance to alkali and (possibly) low stress, as well as ease of deposition process (control and deposition rate), but the galvanic compatibility of CrN with the Al or metal alloy is not optimum because it is conductive. Using a thinner dielectric layer like $SiO_2$ or $Si_3N_4$, that has high intrinsic stress, will isolate the CrN from the metal substrate, thus creating optimum galvanic compatibility. In addition, one can also design and use a combination of different materials to create a "barrier stack" so as to have minimum stress. For example, a highly compressive stress film layer stacked with a highly tensile stress film layer will cancel each other resulting on zero or minimal stress.
7. A thick Al layer on top of the 6061-Al diamond turned substrate with a thin barrier layer increased the overall stack resistance to salt fog and extended humidity environments. In addition, one can consider the Al layer deposited on top of the 6061-Al substrate as being a barrier layer in its own right or as the first layer of a barrier stack. In addition, these thick layers can be polished prior to the deposition of additional layers. The polishing will result in improved surface quality that cannot be achieved with the bare Al-6061 substrate. The use of a thick $SiO_2$ layer for this purpose is known (U.S. Pat. No. 6,921,177).

As mentioned above, mirrors prepared using other reflective metals will have similar advantages though with changes in spectral range and reflection intensity.

The barrier layer, the first and the second interface layers, the silver layer and the tuning layer can each, independently, be deposited using ion assistance. In some embodiments, ion assistance is not used or is used for only part of the deposition process. In all embodiments, the protective layer is deposited using ion assistance. However, these materials can also be deposited using other processes and will perform well over the 0.34 μm to 15 μm wavelength range, with the provision that the process will optimized for the characteristics desire. Ion assist under the correct conditions optimizes stoichiometry and density and possibly structure. An example, different techniques were used to prepare a mirror having the 0.34 μm to 15 μm wavelength range characteristics described herein. The techniques selected were dependent on the materials being used and the goal that was to be achieved.

TABLE 2

Exemplary Materials and Techniques

| Material | Process Comments |
| --- | --- |
| DLC | RF-PECVD process |
| Thick Al | Ultra-high rate thermal deposition or sputtering. No IAD. Substrate source distance critically close. |
| Top $Al_2O_3$ | (a) No Initial IAD, then deposit with IAD after first 2-4 nm; or (b) No IAD at all |
| $YbF_3$ or $YbF_xO_y$ | IAD with or without the use of $O_2$ |
| $Nb_2O_5$ | E-beam IAD or U.S. Pat. No. 5,851,365 |
| $Si_3N_4$ or $SiO_2$ | E-beam IAD or U.S. Pat. No. 5,851,365 |

BRIEF DESCRIPTION OF THE DRAWINGS

FIG. 5B, instead of having just $Si_3N_4$ top of an $Al_2O_3$ second interface layer as in FIG. 5A, has a three part coating consisting of $Si_3N_4$—$SiO_2$—$Si_3N_4$ placed on top of the $Al_2O_3$ layer. This illustrates that the protective layer has to be designed to not only protect the coating and make it more durable, but also to optimize or enhance the reflectivity of the desired wavelength bands.

DETAILED DESCRIPTION

Herein the term "high reflectance" means a reflectance of at least a reflectivity of at least 95% over the wavelength range of 0.4 μm to 15 μm. Also herein the phrase "salt fog" is abbreviated as "SF". The 6061-Al aluminum substrate, or other metallic substrates, is diamond turned and polished before the application of any coating materials. Glass, glass-ceramic or ceramic substrates are ground, lapped and polished before the application of any coating. The abbreviation "AOI" means Angle of Incidence" and is in degrees, and the term "pol" means a "polished aluminum substrate." In the process described herein it is desirable that the substrate temperature be minimized during the deposition of the coating materials. When 6061-Al substrates are used the temperature should be below the heat treating and stress relief temperatures of 6061-Al which are 415° C. and 350° C., respectively.

Figure 1A:
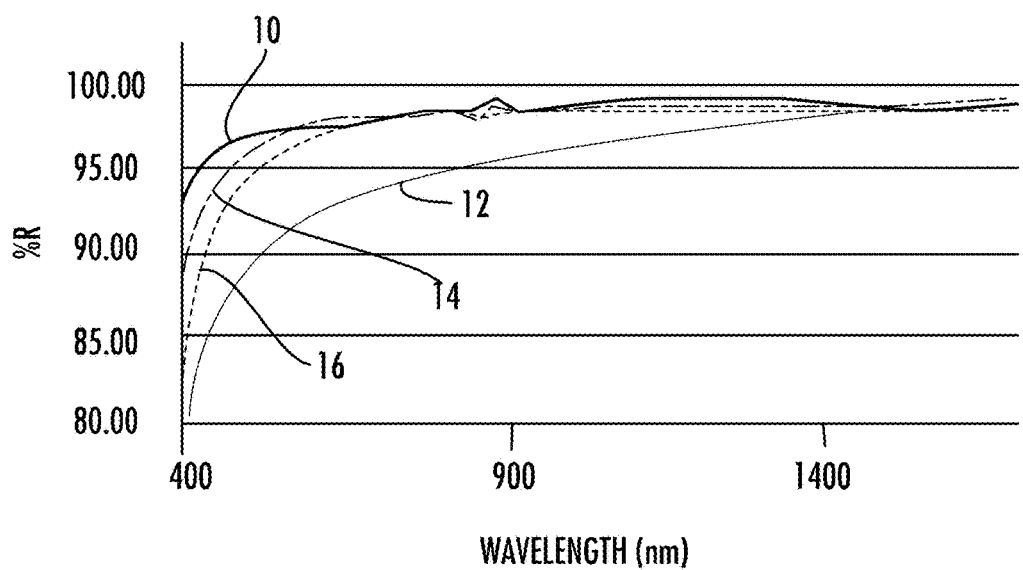
FIG. 1A is a graph illustrating the effect of ion-assisted deposition (IAD) of the Ag layer on the performance of a substrate/CrN/Ag mirror both before and after a 2 hour salt fog (SF) test compared to a mirror in which IAD was not used.
Figure 1B:
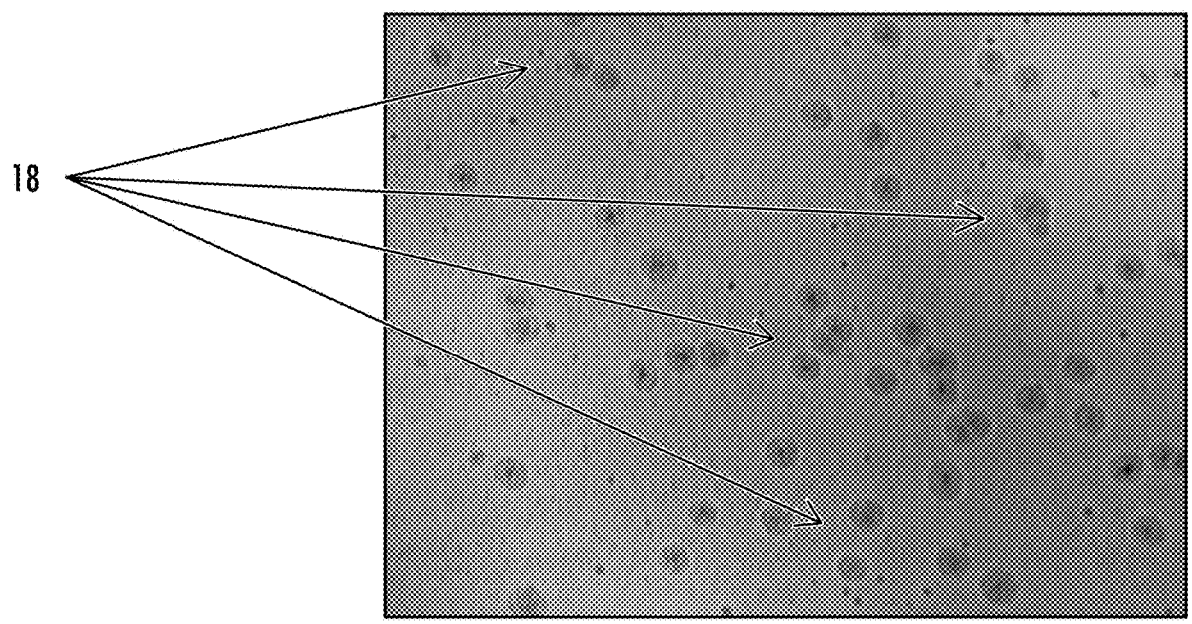
FIG. 1B is an optical microscope image (magnification 374×) illustrating the surface deterioration, the dark spots indicated by the arrows 18, the after 2 hours exposure to salt fog of a mirror in which the silver coating was deposited without IAD assistance.
Figure 1C:
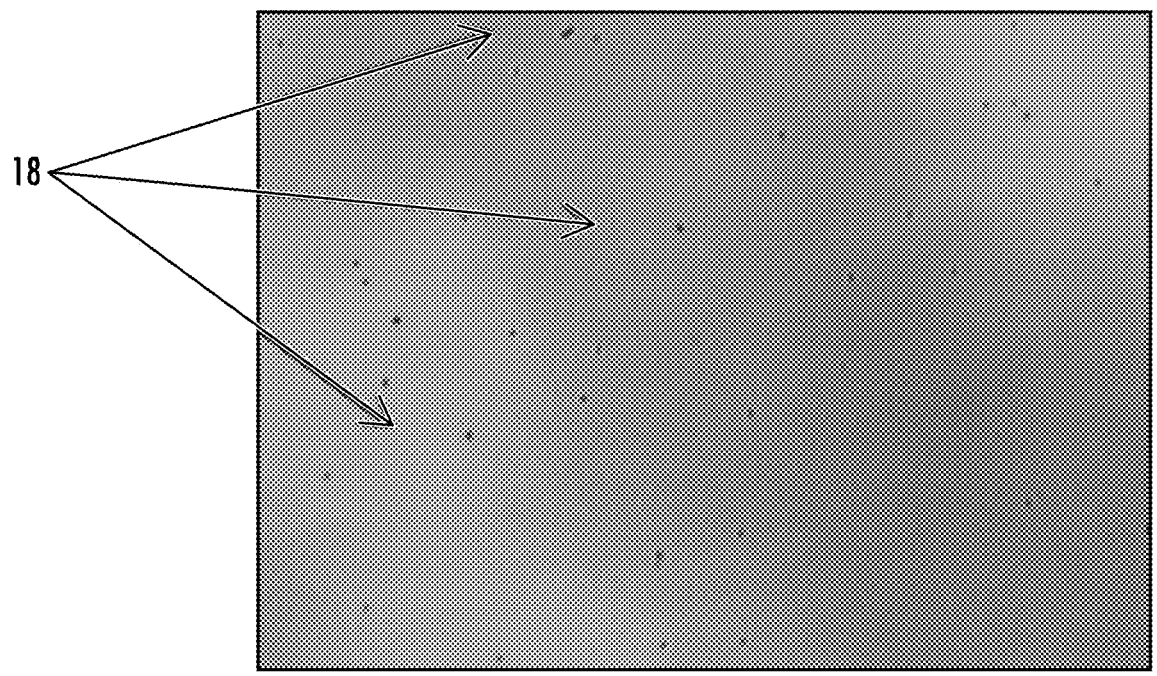
FIG. 1C is an optical microscope image (magnification 374×) illustrating the surface deterioration, the dark spots indicated by (arrows 18, after 2 hours exposure to salt fog of a mirror in which the silver coating was deposited with IAD assistance, the deterioration being retarded relative to that in FIG. 1B as a result of using ion assistance during the deposition of the silver layer.
Figure 2A:
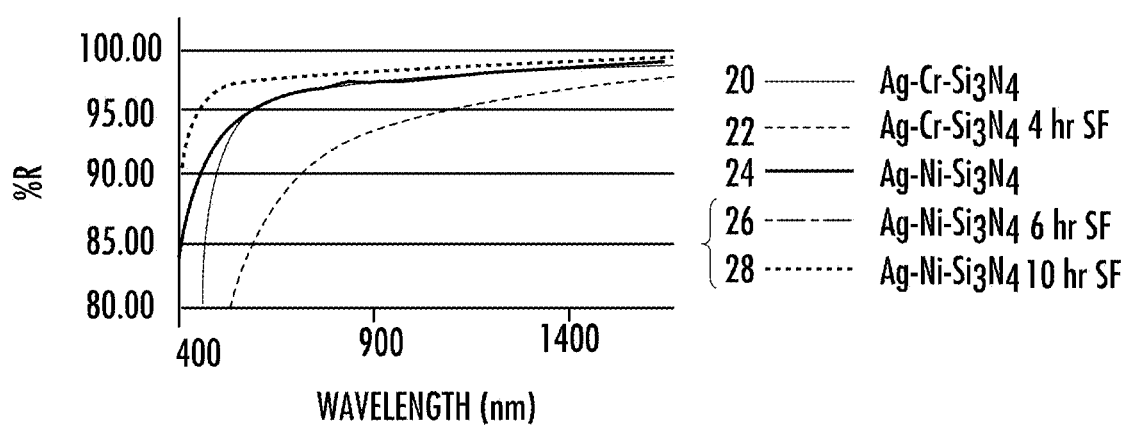
FIG. 2A a graph of Reflectance versus Wavelength of Ag/Cr/$Si_3N_4$ and Ag/Ni/$Si_3N_4$ mirrors after 0, 4, 6 or 10 hours of salt fog (SF) exposure; numerals 20 and 22 being the Cr-containing mirror after 0 and 4 hours SF exposure, respectively, and numerals 24, 26 and 28 being the Ni-containing mirror after 0, 6 and 10 hours SF exposure.
Figure 2B:
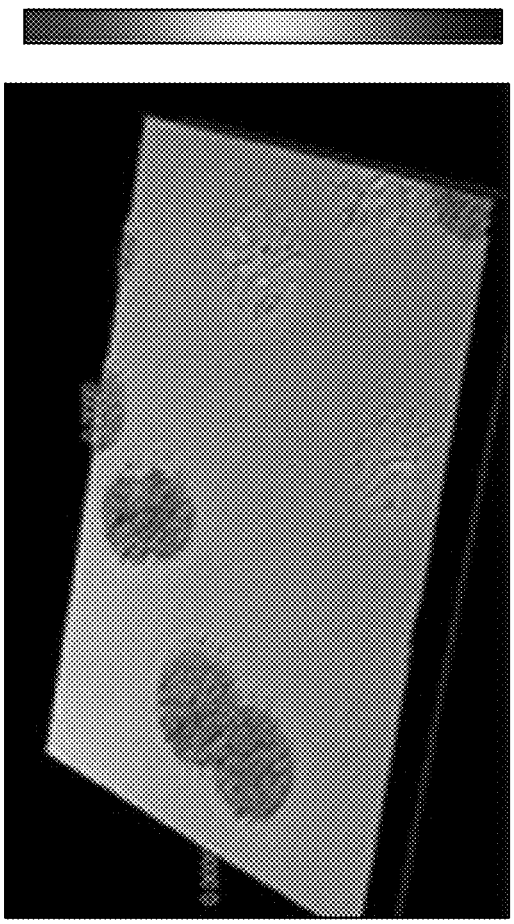
FIG. 2B is a photograph of mirror illustrating the effects of galvanic potential difference on controlled stack of coating on a glass substrate, the stacks being Ag/Cr/$Si_3N_4$ (upper photograph) and Ag/Ni/$Si_3N_4$ (lower photograph) after 4 hours and 5 hours salt fog exposure, respectively.
Figure 2B:
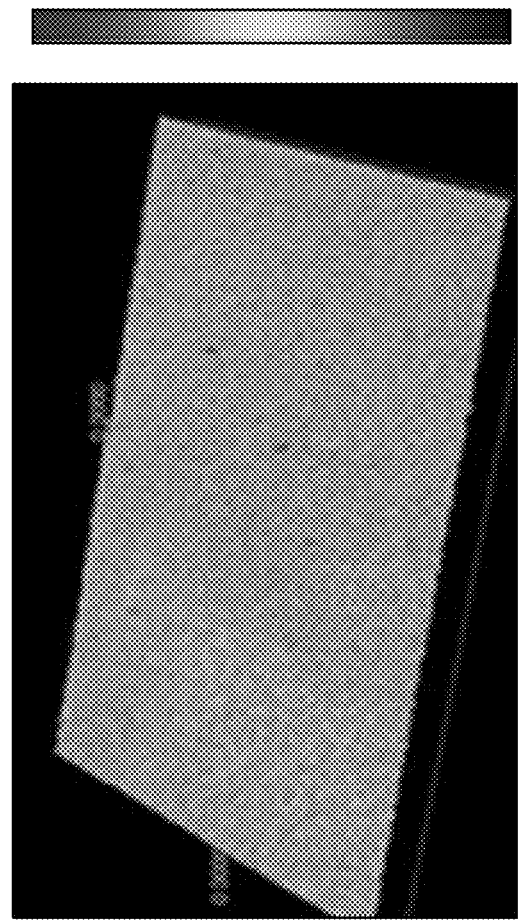

The Reflective Layer:

Due to the multiband reflection requirements, ranging from visible (VIS) through the long wave infrared (LWIR), 0.40 μm out through 15 μm, a thin film layer of silver is used for the reflective layer. Silver is known to have the highest reflectivity, lowest polarization splitting, and lowest emissivity through this entire wavelength range. [See S. A. Kovalenko and M. P. Lisita, "*Thickness dependences of optical constants for thin layers of some metals and semiconductors*," Semiconductor Physics, Quantum Electronics and Optoelectronics Vol. 4, No. 4, pages 352-357 (2001); Chang Kwon Hwangbo, et al, "*Ion assisted deposition of thermally evaporated Ag and Al films*", Applied Optics Vol. 28, No 14, (Jul. 15, 1989); and N. Thomas et al, "*Protected Silver Coating for Flashlamp-Pumped Nd:glass Amplifiers,*" 30th Annual Symposium on Optical Materials for High Power Lasers; Boulder, Colo. Sep. 30-Oct. 2, 1998; (preprint from Lawrence Livermore Laboratories; site location http://library.llnl.gov/uhtbin/cgisirsi/mgYv2G09Sa/MAIN/103110005/60/502/X; search term "30$^{th}$ annual symposium," Paper #1, 236354 (UCRL-JC-135179, preprint). The following characteristics are critical to many multiband imaging systems.
 (1) The silver layer must have a minimum thickness to obtain optimum reflectivity. It is suggested in the literature that the thickness be on the order of 150 nm, depending on the process used to deposit the silver. A silver layer thickness in the range of 135 nm to 175 nm is beneficial.
 (2) The process that is used to deposit the silver layer influences the durability of the silver layer.
 (3) FIGS. 1A-1C illustrate how ion-assisted deposition (IAD) of silver improves it chemical durability. It was noted that there was some reflection loss is seen at the 400 nm range of the pretest IAD scan, probably due to the trapping of gas atoms used for bombardment.

In FIGS. 1A-1C the substrate was silica glass having a CrN barrier layer on top of the glass and a silver layer deposited on top the barrier layer. No coating layers were applied on top of the silver layer. Numeral 10 designates an article where the silver layer was deposited on top of the barrier layer without ion-assistance and the reflectance measured after deposition, but before salt fog testing. Numeral 12 designates the article of numeral 10 after it has been exposed to salt fog for 2 hours. Numeral 14 represents an article where the silver was deposited on top of the barrier layer with ion-assistance and the reflectance measure after deposition, but before salt fog testing. Numeral 16 represents the article of numeral 14 after it has been exposed to salt fog for 2 hours. The graph clearly indicates that that without ion assistance the reflectivity of the silver coating deteriorates much more quickly then the coating with ion assisted deposition after just 2 hours of salt fog testing. In FIG. 1B, taken at 374× optical magnification, dark "spots" 18 indicated by arrows are the corrosion that has taken place on the silver coating surface. In FIG. 1C there are much fewer corrosion spots and those that are present are much smaller which indicates the clear advantage of ion assistance during the deposition of the silver reflecting layer.

Barrier Layer

Since Al-6061 is the substrate material used in these applications (though other light weight, diamond machined alloys, silica, fused silica and F-doped fused silica can also be used), a barrier layer must be used between the silver layer and the substrate, or an Al layer deposited on any of the foregoing substrates to create galvanic compatibility. The military standards for the use of dissimilar metals are defined in MIL-STD-889B and MIL-STD-1250. These documents suggest, for systems that are expected to be exposed to harsh environments such as hot and humid and/or containing salts, that dissimilar metals should not be joined or interfaced if they exceed a galvanic potential difference of 0.25V (in a high humid environment with no salts the potential difference can be >0.45V). In some of the engineering literature on corrosion a potential difference of 0.15V is suggested for harsh salt environments. Al-6061 is considered an anodic material with a potential of 0.90V while silver, a cathodic material, has a potential of 0.15V, resulting in a potential difference of 0.75V. Interfacing anodic metals to Al as the barrier material, for example cadmium, iron, and carbon, results in a low potential difference of <0.25V. The galvanic potential difference is >0.25V for tin, 0.33V for chromium, 0.33V for zinc, 0.63V for nickel 0.83V for magnesium. We have also effectively used TiAlN (this TiAlN can be made to behave like metal or like a dielectric depending on the Ti—Al ratio), and dielectric coatings such as diamond like carbon (DLC), $Al_2O_3$, $Si_3N_4$, $Si_xN_yO_z$, $SiO_2$, and $TiO_2$. While CrN has been used with some success, care must be exercised in view of the intended application because its galvanic compatibility is border-line.

Figure 9:
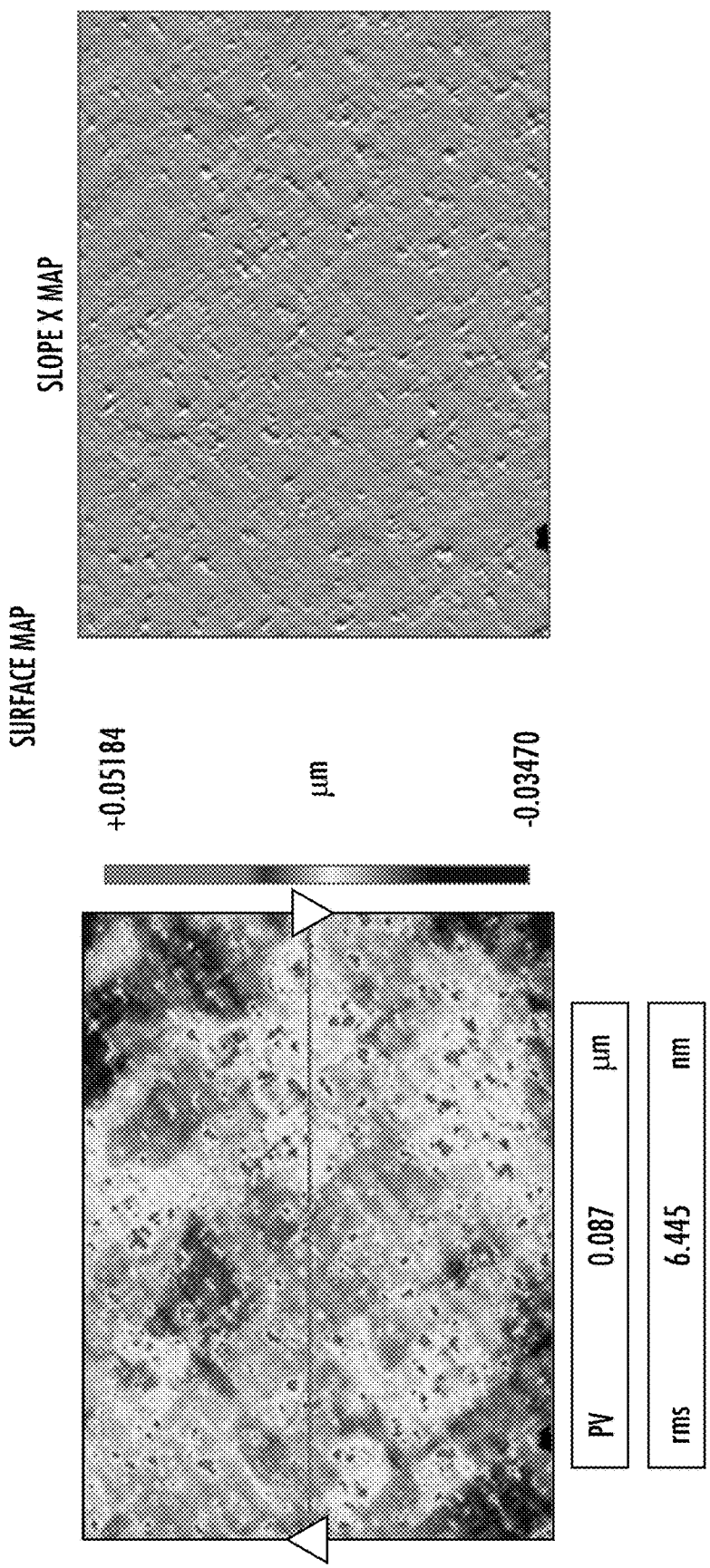
FIG. 9 are interferometer results showing precipitate peaks or nodules on the surface of diamond turned and polished 6061-Al before coating; the being characterized using EDS and identified as being impurities in the 6061-Al alloy. These large precipitates create a non-homogenous surface which makes it difficult to obtain a surface finish less than 60 A rms, the best results being about 30 A rms, which was obtained with difficulty.

The surface quality of the 6061-Al also plays an important role. Large precipitate sites are formed by the "impurities" in the 6061-Al, some of which come from the controlled addition of materials required in order to meet material specifications for strength characteristics, and other impurities are simply contaminants. The large precipitates make it difficult to achieve a smooth surface, <30 Å rms, and some of the high peaks or nodules may result in poor adhesion (or cracking from stresses or voids) between the substrate and the coating stack (silver layer, or silver layer covers differently), resulting in a defect site once the completed mirror is exposed to the environmental testing using both salt fog and long term humidity conditions. An approach to manage this condition is to deposit a very thick barrier layer that result in effectively coating over these sites. FIG. 9, illustrating the finished surface of a 6061-Al substrate before is it coated with any material, shows the presence of these nodules. Barrier layer materials are selected from the group consisting of $Si_3N_4$, $Si_xN_yO_z$, $SiO_2$, TiAlN, TiAlSiN, $TiO_2$, $Si_xN_yO_z$ and DLC, and additionally Al or $Al_2O_3$.

The presence of large precipitates creates a non-homogenous surface which makes it difficult to obtain a surface finish less than 60 Å rms, the best results being about 30 Å rms, which was obtained with difficulty. The presence of the nodules serves to illustrate why the presence of the barrier works to improve reflectivity. Without being held to any particular theory, the nodules can become defect sites where localized corrosion occurs when exposed to these harsh environments. They may result in poor adhesion, so coating cracks or falls off at sites exposing areas or creating pathways. A sufficiently thick barrier layer can smooth out this surface and create a continuous film with good adhesion across the entire surface. If this barrier layer surface is sufficiently thick, polishing the layer prior to the placement of additional coating layers would result in better surface finish in the approximate range of 5 Å to 15 Å.

The thickness of the barrier coating can be in range of 10 nm to 100 µm. When the nodules or other surface defects are present on the substrate and cannot be removed, the barrier coating is in the higher end of the range and must be sufficient to cover the nodules. If the substrate is substantially free of the nodules then the barrier coating can be at the lower end of the range. In addition, the use of ion assistance during the deposition of the barrier layer will densify the barrier coating and aid in providing a smooth surface.

Interface Layer A and B

Silver and gold have considerably lower oxide formation energies compared to other metals like titanium, aluminum, chromium, and nickel, and because of this silver and gold do not adhere well to many materials. It has been known for some time that ultra-thin films of Cr and Ni, or alloys of these metals, are excellent adhesion promoting layers for silver due to the metal-to-metal diffusion with Ag (or gold), along with metallic bonding strengths between Ag or Au and Cr or Ni. Because of the environments the mirrors disclosed herein will be exposed to, galvanic compatibility is critical and therefore must be considered when choosing the interface material. The galvanic potential difference at the interface of silver-Cr and silver-Ni are 0.45V and 0.15V respectively. Table 1 illustrates the significant role the galvanic potential difference has in the performance of the coating stack when it is exposed to a salt fog environment. Nickel or $Al_2O_3$ have been used as the first interface layer between the barrier and the silver layers because the two materials are compatible.

Figure 3:
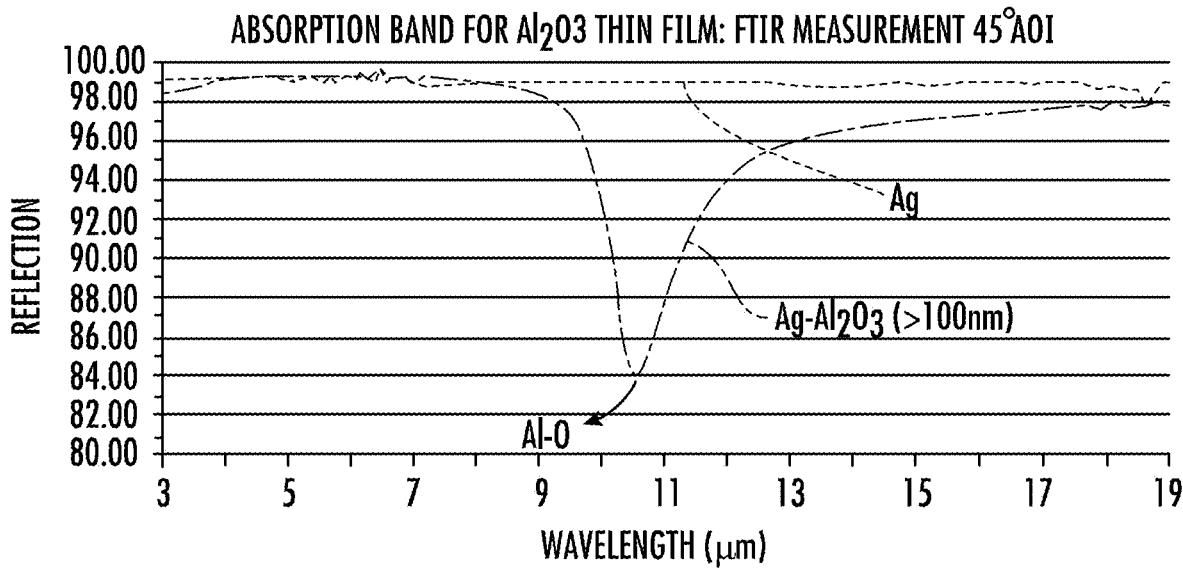
FIG. 3 is a graph illustrating the AL-O absorption band at approximately 10.7 μm for an $Al_2O_3$ greater than 100 nm thick.
Figure 4:
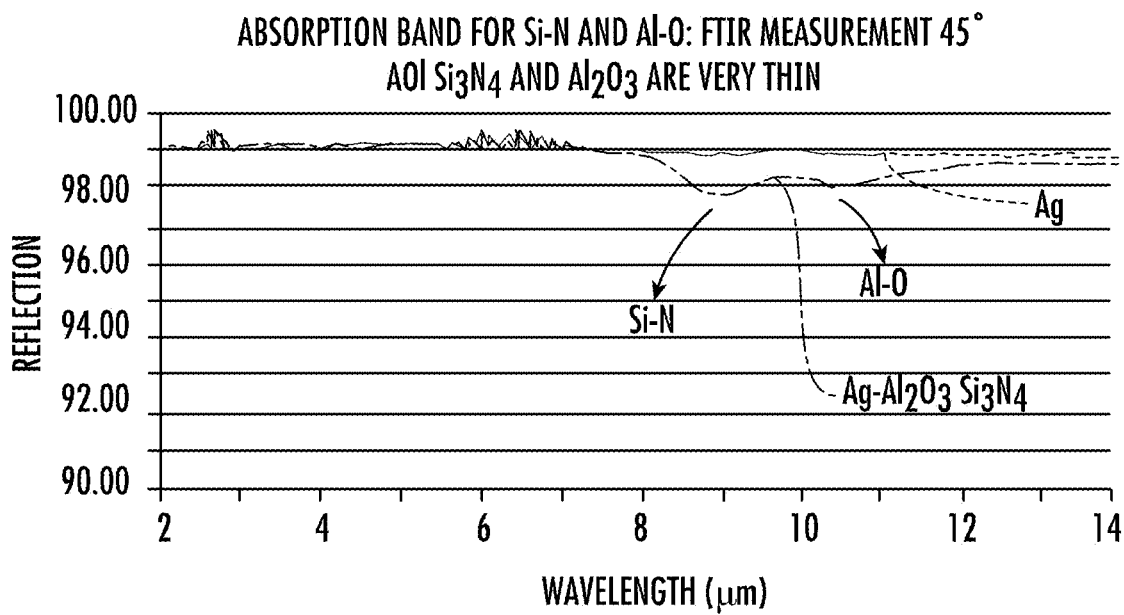
FIG. 4 is a graph of the absorption band for Si—N and Al—O at approximately 9.1 μm and 10.7 μm, respectively, for $Si_3N_4$ and $Al_2O_3$ thin films that are less than 100 nm thick.

$Al_2O_3$ has been discussed in the literature as an adhesion promoting material for certain metals; specifically the discussion involves Ag—$Al_2O_3$ and Al—$Al_2O_3$ non-stoichiometric interfaces, and how they influence adhesion (W. Zhang and J. R. Smith, *Nonstoichiometric interfaces and $Al_2O_3$ adhesion with Al and Ag*, Physical Review Letters, Vol 85, No 15, Oct. 9, 2000, pages 3225-3228; Jiwei Feng, et al., *Ab initio study of Ag/$Al_2O_3$ and Au/$Al_2O_3$ interfaces*, Physical Review B, 72, 115423, Sep. 21, 2005). The data in these papers show deviations of $Al_2O_3$ from stoichiometry at the interface can significantly affect adhesion with the either Ag or Al metal, two metals chosen for their oxide heats of formation being at opposite end of the range. M. A. Scobey, U.S. Pat. No. 5,851,365 titled "Low Pressure Reactive Magnetron sputtering apparatus and method," describes the conditions for two types of deposition processes: ion-assisted deposition (IAD) and e-beam deposition, and a low pressure reactive magnetron sputtering process, that produce optimum adhesion between $Al_2O_3$—Ag, and $Al_2O_3$—Al. Due to the first interface being on the backside of the reflective layer, between the substrate and the Ag layer, it's upper limit of thickness is not limited by absorption, but should be monitored for stress considerations. On the front side of the reflective layer, the second interface layer, the layer deposited on top of the Ag layer and the thickness of interface must be limited to minimize its absorption band in the LWIR band while obtaining optimum adhesion to Ag. This absorption band is illustrated in FIG. 3 which appears as the peak at approximately 10.7 µm. ZnS is an additional non-conducting material that can be used as an adhesion layer, avoiding galvanic compatibility issues. For example, ZnS has been found to be a successful interface material, for example, at a gold interface Au—ZnS—$YbF_3$ or Ag—ZnS—$YbF_3$.

The Protective Layer and Tuning Layer(s)

Silver can react with various substances that may be present in the atmosphere, for example salts, acids, and sulfur compounds. Well known examples are silver tarnishing which is the formation of black silver sulfide ($Ag_2S$) by the reaction of $Ag^0$ with sulfur containing compounds and silver corrosion which results from the reaction of $Ag^0$ with halogen-containing substances in the atmosphere, the most common of which is probably NaCl and HCl (T. E. Graedel, *Corrosion Mechanisms for Silver Exposed to the Atmosphere*, J. Electrochemical Society Vol. 139, No. 7, pages 1963-1969 (1992), and D. Liang et al, *Effects of Sodium Chloride Particles, Ozone, UV, and Relative Humidity on Atmospheric Corrosion of Silver*, J. Electrochemical Society Vol. 157, No. 4, pages C146-C156 (2010)). Both corrosion and tarnishing can be accelerated by the presence of humidity and ozone in the atmosphere.

The Vickers hardness (HV) of silver is 100 HV (electrodeposited), which is low compared to the other end of the HV spectrum where diamond has a value of 10,000 HV. As a result of the relative softness of silver compared to other materials, the handling of a silver coated optics for system assembly, or cleaning the optics which include mirrors, will often result in damaging the silver surface. As a result a protective layer is needed to minimize damaging the silver surface. In order to be effective the protective layer must be (1) sufficiently dense such that no pathways are provided from the optic's surface to silver and interface layers, (2) insoluble in alkali and acidic environments, (3) mechanically hard to provide scratch resistance, and (4) have either (a) only minimal absorption throughout the entire wavelength range of interest, 0.34 µm to 15 µm in the present case, or (b) no absorption over the 0.34 µm to 15 µm wavelength range. Silicon nitride, $Si_3N_4$, was tested for its alkali diffusion properties, solubility in alkali solution and for its mechanical hardness properties, and was found to provide a very durable and chemically resistant coating. However, while this material was unfortunately found to have an absorption band at approximately 9.1 µm, this disclosure shown that if the $Si_3N_4$ is sufficiently thin it can be used. The exact thickness depends on the throughput of the system for the band range. For some applications this band is of no interest so the thickness is of limited consequence.

Figure 5A:
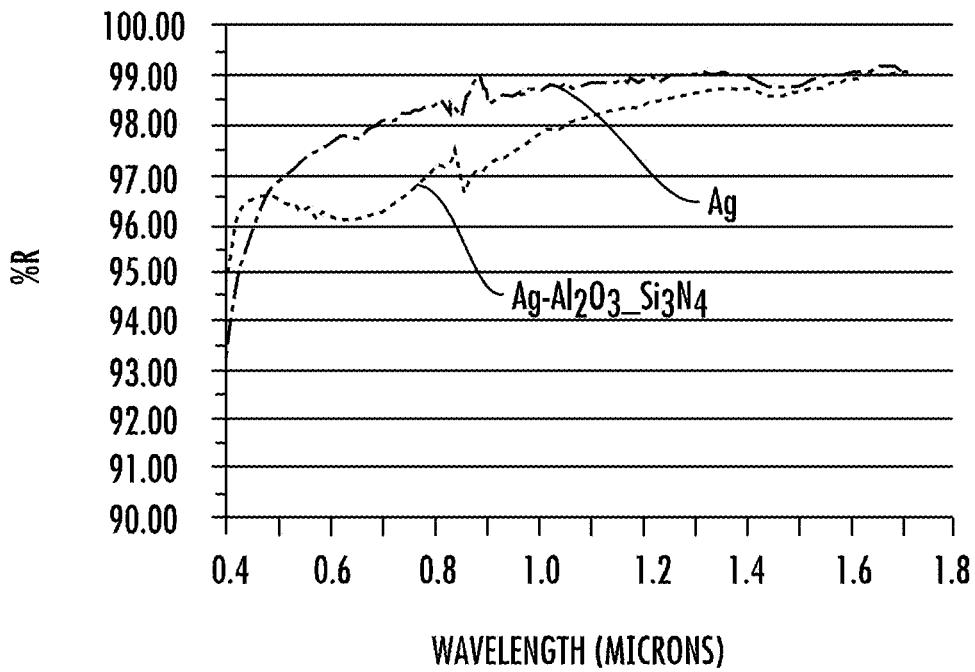
FIG. 5A is a graph of a partial stack illustrating the reduction in reflectivity when a thin protective of $Si_3N_4$ is placed on top of an $Al_2O_3$ second interface layer covering the Ag layer, the graph showing a reduction in reflectivity not only from 0.5 μm to 0.8 μm, but also out to 1.6 μm. This is not due to absorption part (k) of the dispersion properties but to refractive index n and matching these indices in the stack design.
Figure 5B:
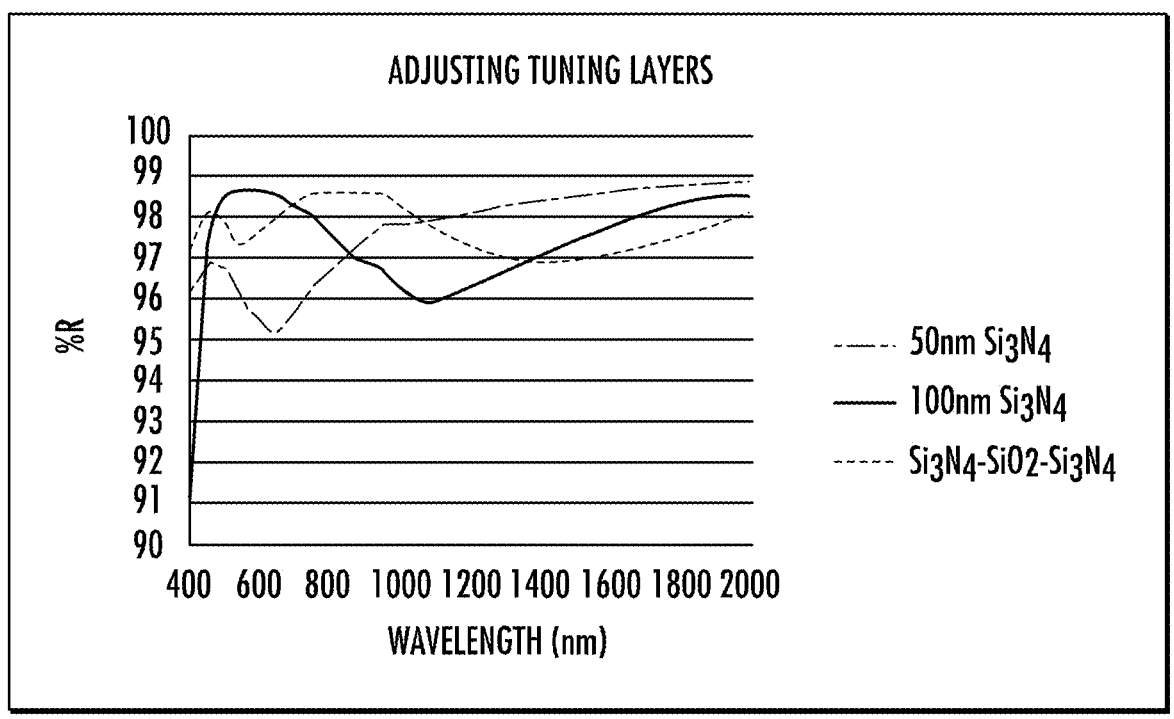
FIG. 5B is a graph illustrating a theoretical stack and showing how adjusting the materials affects the reflectivity.

A single protective layer along with the ultra-thin interface layer reduces the stack reflection performance in the VIS range out into the SWIR bands, as observed in FIGS. 5A and 5B. Because different applications of the mirrors disclosed herein require the application of the tuning layers in order to optimize reflection in defined wavelength regions, these tuning layers need to have characteristics similar to those of the protective layer, but some minimal trade-offs can be made in the durability of these materials. To tune for the desired reflectance bands the thickness of the tuning layer(s) will have to be varied and a combination of low, medium and/or high index materials are used. The thickness of the tuning layer(s) is in the range of 75 nm to 300 nm. The protective layer applied on top of the tuning layer(s) has a thickness in the range of 60 nm to 200 nm.

Figure 6A:
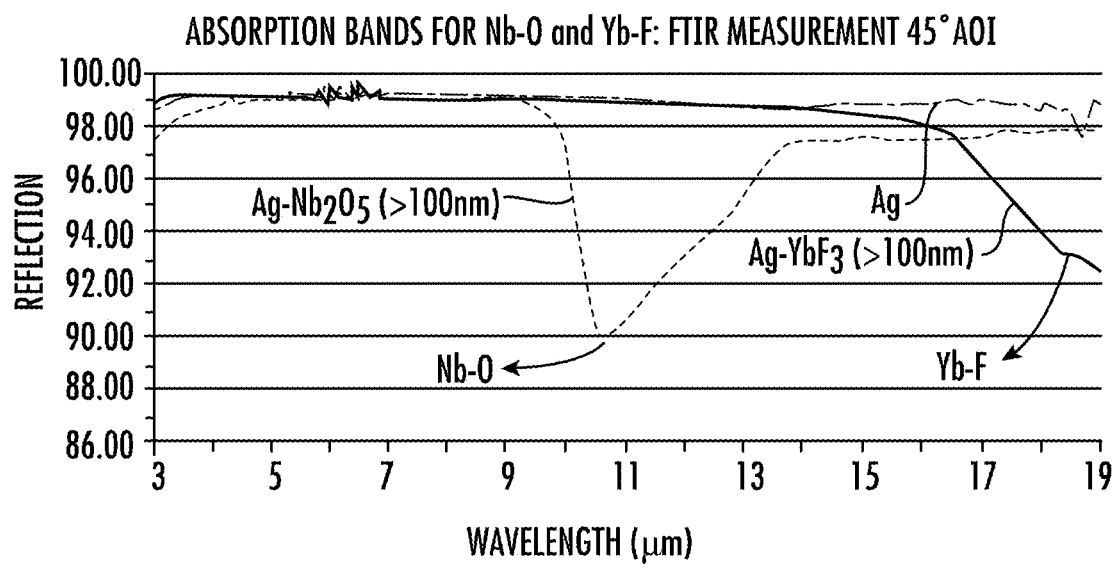
FIG. 6A is a graph illustrating the absorption band for $Nb_2O_5$ and $YF_3$ when the coating thickness of these materials is >100 nm.

Corning has developed thin film deposition processes, for example the process described in U.S. Pat. No. 7,242,843, which can be used for ytterbium fluoride ($YbF_3$) and yttrium fluoride ($YF_3$), both of which are low refractive index materials. When the process is used to coat highly reflective silver mirrors the results indicate that the resulting mirrors are highly resistant to alkali solutions while also providing scratch resistance that meets the military specification moderate abrasion testing procedures; properties that will aid in protecting the silver layer. The low refractive index materials were used in combination with high refractive index materials, for example, niobium pentoxide ($Nb_2O_5$) and zinc sulfide (ZnS). FIG. 6A shows the reflectance of (a) Ag (only), (b) Ag—$Nb_2O_5$ and (c) Ag—$YbF_3$ coatings over the wavelength range of 3 µm to 19 µm. In FIG. 6A the Ag(only) film has a reflective of at least 98% over the wavelength range of the graph, 3 µm to 19 µm, except for a small decrease at approximately 18.6 µm, and is substantially 99% reflective over the wavelength range of 3 µm to approximately 17 µm. The Ag—$Nb_2O_5$ coating shows an Nb—O absorption with the reflectivity dipping below 96% over the approximate wavelength range of 10 µm to 13 µm. The Ag—$YbF_3$ coating shows Yb—F absorption with reflectivity of greater than 98% in the wavelength range of 3 µm to 16.5 µm. The Reflectance for all three coating was measured at AOI=45°.

Figure 6B:
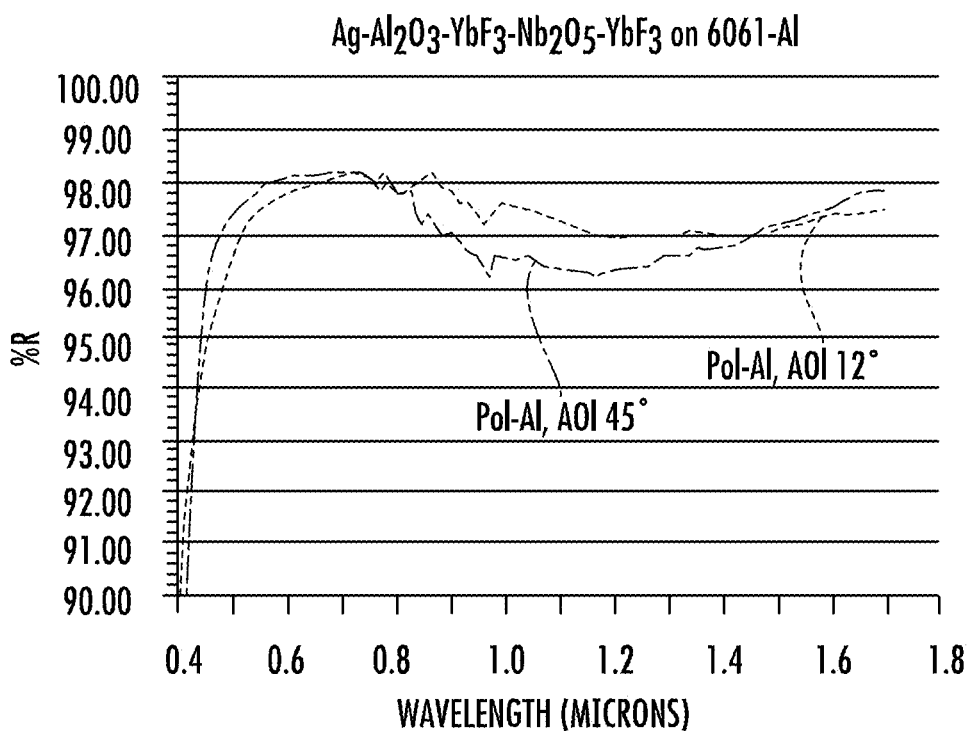
FIGS. 6B and 6C are graphs illustrating the optical performance of an actual stack designed for VIS-SWIR-MWIR-LWIR band performance, with adjustment to the $Nb_2O_5$ layer to minimize absorption in the LWIR band.
Figure 6C:
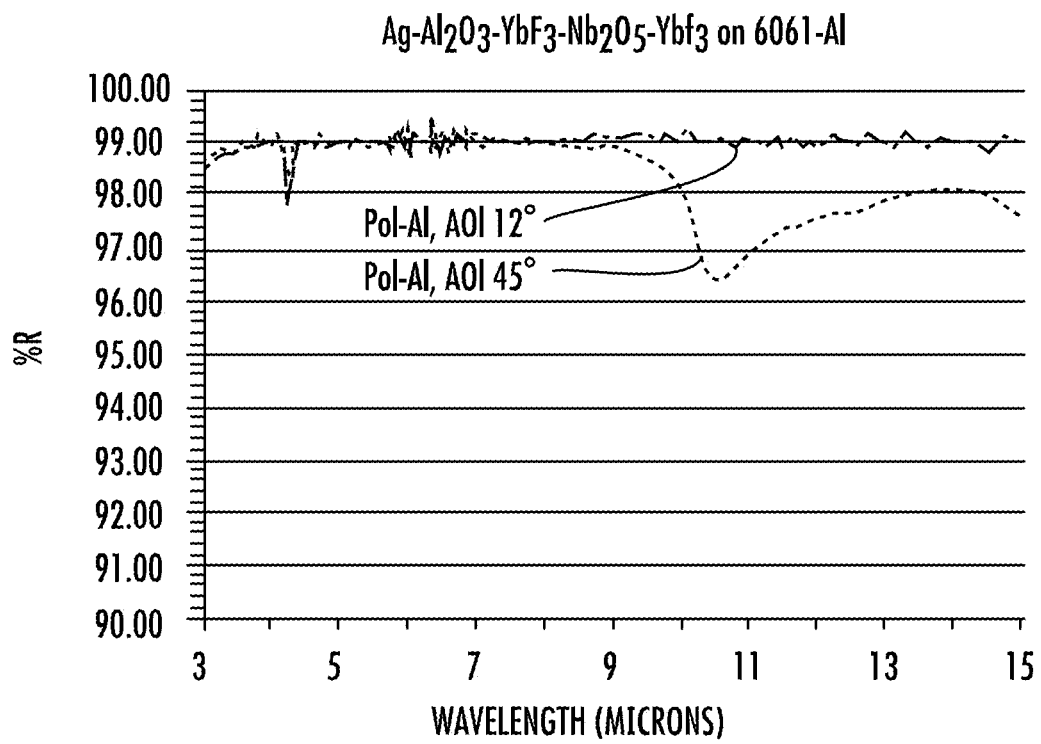

Using $YbF_3$ as an exemplary low refractive index fluoride material, a coating combination of $YbF_3$—$Nb_2O_5$—$YbF_3$ was tuned for high reflectivity in the VIS range, 0.34 µm to 0.75 µm, and also in a MWIR-LWIR range of 3 µm to 11.3 µm. FIG. 6B, Ag—$Al_2O_3$—$YbF_3$—$Nb_2O_5$—$YbF_3$ on 6061-Al having a barrier layer, shows that when measured in VIS-SWIR range of 0.4 µm to 1.7 µm at an AOI of 45° the coating has a reflectivity of greater than 96%, and when measured at an AOI 12° the reflectivity is substantially 97%. FIG. 6C, Ag—$Al_2O_3$—$YbF_3$—$Nb_2O_5$—$YbF_3$ on 6061-Al having a barrier layer, shows that in the MWIR-LWIR range of 4 µm to 15 µm, (a) at an of AOI 12° the reflectivity is substantially 99% over the wavelength range and (b) at an AOI 45° the reflectivity was greater than 96% over the wavelength range and greater than 98.5% over substantially the entire range of 3 µm to 15 µm. When oxygen is used during the deposition of the $YbF_3$ material the deposited layer becomes a ytterbium oxyfluoride materials that is designate herein as $Yb_xF_yO_z$, and the thickness of this layer is the in the same range as that for $YbF_3$.

The tuning layer and the protective layer can also be combined into a single layer using a single material which is $Yb_xF_yO_z$. When only a single tuning/protective layer is used the thickness of the layer is in the range of 150 nm to 350 nm.

Figure 7:
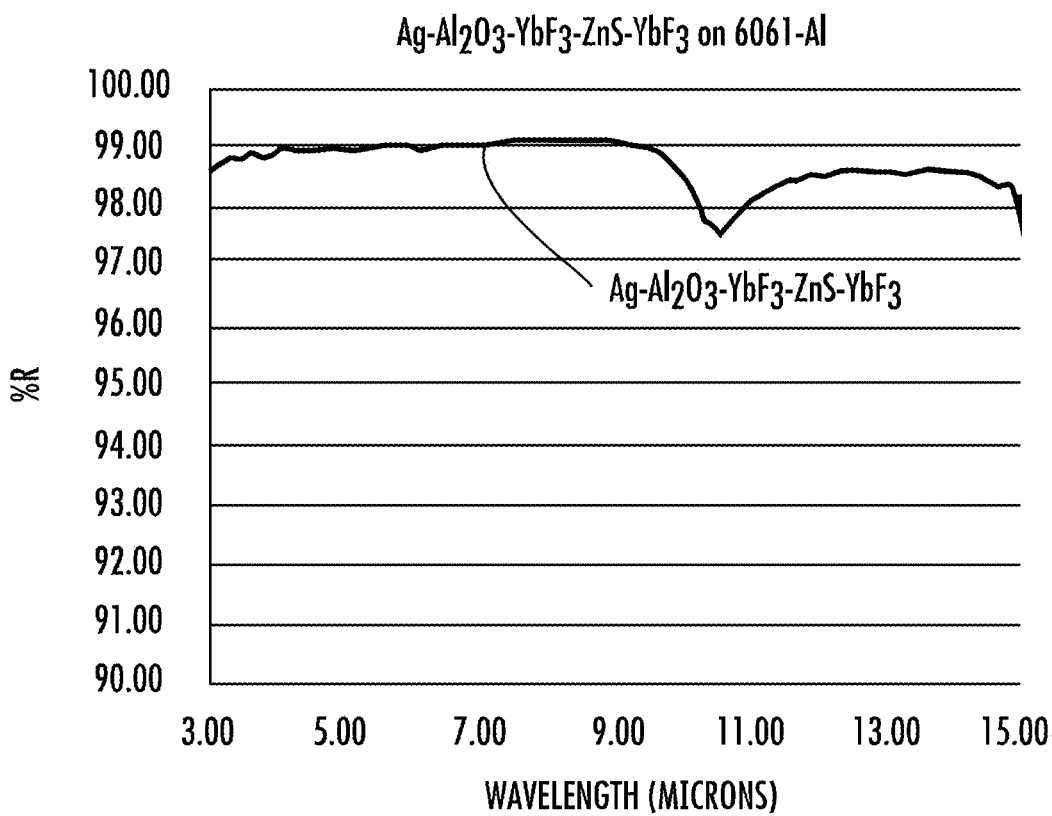
FIG. 7 is a graph of Reflectance versus wavelength illustrating that the use of a high refractive index material, for example $YF_3$, in the desired MWIR and LWIR bands which results in a higher % R performance.

It was found that the combination $YbF_3$ (low refractive index) and ZnS (high refractive index) provides minimum absorption throughout the desired wavelength range. FIG. 7 is a graph of reflectance versus wavelength of an Ag—$Al_2O_3$—$YbF_3$—ZnS—$YbF_3$ stack of coatings on a 6061-Al substrate having a barrier layer. The graph shows the LWIR absorption at approximately 11 µm from the $Al_2O_3$ interface layer. The minimum $Al_2O_3$ thickness required to achieve optimum adhesion still results in observable absorption, unlike using an ultra-thin Ni layer as the interface layer, which would results in less absorption.

Materials that found to be useful as protective layers are $YbF_3$, $YF_3$, and $Si_3N_4$. $YbF_3$ and $YF_3$ (low refractive index), $GdF_3$ (medium refractive index in VIS range), and ZnS and $Bi_2O_3$ (both high refractive index) are materials that can be used for tuning and that have minimum absorption in all bands including the LWIR. In addition, $Si_3N_4$ (medium refractive index), and $Nb_2O_5$, $TiO_2$ and $Ta_2O_5$ (all three high refractive index) can be used as a tuning layer materials, but their LWIR absorption bands need to be considered in view of the application in which the mirror will be used.

Figure 8A:
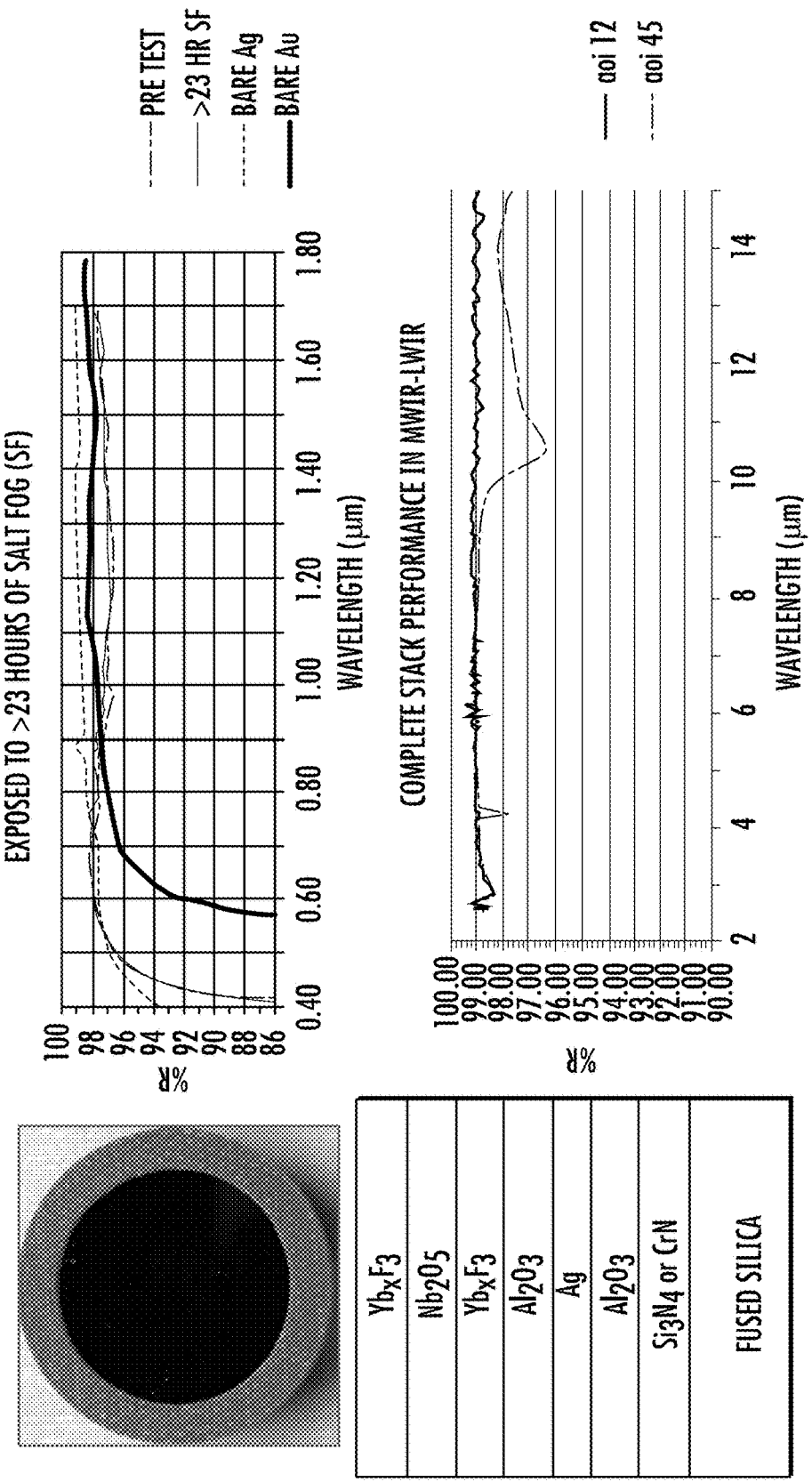
FIG. 8A is provides graphs and an illustration of a mirror, fused silica substrate, with an EDIS coating having a barrier layer after greater than 23 hours exposure to salt fog showing that there was no measurable change in performance after salt fog exposure; the configuration being, from substrate to top layer, fused silica, $Si_3N_4$ or CrN, $Al_2O_3$, Ag, $Al_2O_3$, $YbF_3$, $Nb_2O_5$, $YbF_3$.

Combining the Layers together, and Testing for Durability and Spectral Performance Different combinations can be used to meet various military specification environmental tests. The most difficult test to successfully pass is the 24 hour salt fog test. The coating stacks used for FIGS. 6A and 6B were deposited on both fused silica substrates and diamond turned 6061-Al substrates. The test results are shown in FIGS. 8A and 8D after >23 hours salt fog testing and 120 hours humidity testing (respectively) at relative humidity, RH, of approximately 98% in accord with the Mil-C-48497 specification. No measurable change was detected for the spectral performance for both tests, salt fog and humidity. FIG. 8A indicates that the coating stack on fused silica substrate resulted in passing >23 hours of exposure to salt fog in accordance per the Mil-C-48497 specification. In FIG. 8D, the identical stack and barrier layer used for FIG. 8A was deposited on a 6061-Al substrate and the resulting mirror was exposed to 120 hours of humidity in accord with the same Mil-C-48497 specification.

Figure 8B:
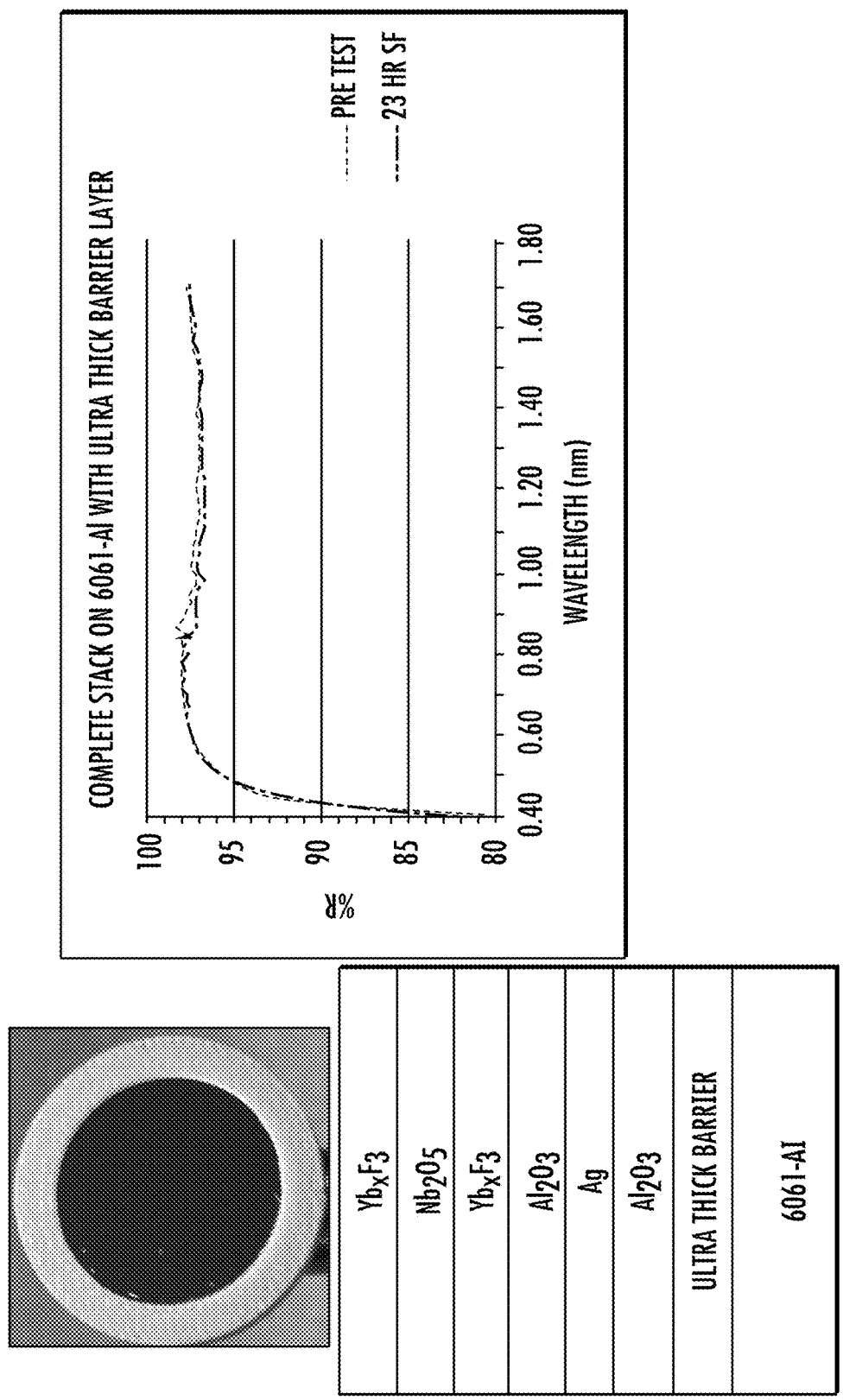
FIG. 8B provides a graph and an illustration of a mirror, 6061-Al substrate, with an EDIS coating and a thick barrier layer after greater than 23 hours exposure to salt fog; the graph illustrating that there is a potential for causing out of specification A-figure and A-temperature performance; the configuration being, from substrate to top layer, 6061-Al, ultra thick Ni barrier, $Al_2O_3$, Ag, $Al_2O_3$, $YbF_3$, $Nb_2O_5$, $YbF_3$. No blemishes were observed on the mirror after the salt fog testing. The Ni was deposited by electroless plating on the 6061-1 substrate. Regarding the performance of a coated mirror with regard to temperature changes, this is particularly related to the CTE of both the substrate and barrier layer. The difference between the two will cause distortion to the optic or a change in figure with changes in temperature. The thicker the barrier layer the more of a change in figure, and the larger difference in the CTE of the substrate and barrier layer the more the increase in figure change. Consequently, it is necessary to design-in the CTE and the thickness in order to minimize Δ-figure and Δ-temperature.
Figure 8C:
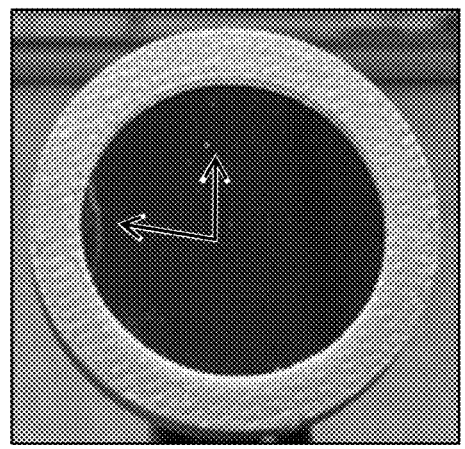
FIG. 8C is an illustration of a mirror similar to that of in FIG. 8B except that the mirror has a thin barrier layer after 6 hours salt fog testing; the mirror showing a blemish on the left at the arrow.
Figure 8D:
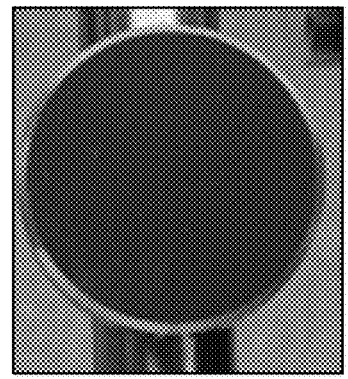
FIG. 8D is a complete stack formed on turned 6061 aluminum that passed all tests after exposure to 120 hours of humidity exposure (3.4.1.2), moderate abrasion (3,4,1,3 and adhesion testing (3.4.1.1).
Figure 8D:
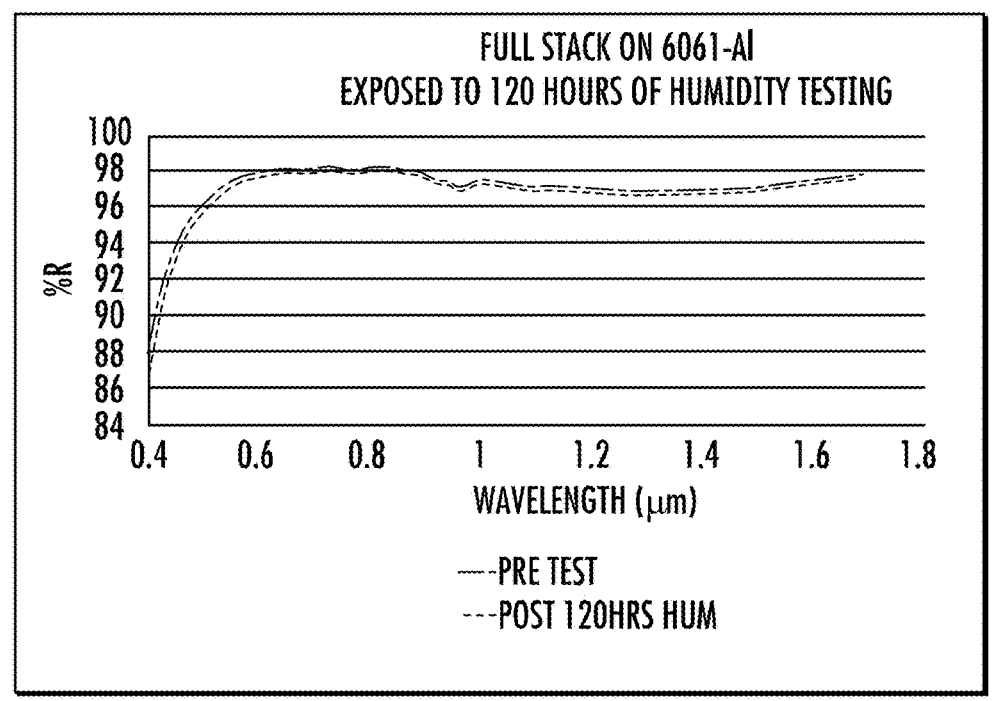

FIGS. 8B and 8C illustrate the role of the barrier layer when a coating stack is deposited on 6061-Al and the resulting mirror is exposed to the salt fog environment. The stack break-down resistance is low for a thin barrier layer and increases as the barrier layer becomes thicker. The mirror of FIG. 8B, which has a thick barrier layer, passed the salt for test whereas the mirror of FIG. 8C, which has a thin barrier layer, developed defects which are pointed out by the arrows in the figure. As indicated above, different materials can be for the barrier layer, including $Si_3N_4$, $SiO_2$, DLC, and CrN. These materials can be deposited using different processes that have included IAD e-beam, low pressure DC magnetron sputtering (U.S. Pat. No. 5,851,365, Corning Incorporated), CVD, sol-gel, and metal plating.

Process considerations for depositing the stack must be taken into consideration and these considerations are material and interface dependent. Because film density and stoichiometry are critical, ion beam bombardment is used during the deposition. Ion energies and densities must be adjusted appropriately so as to densify, but not damage the film. Gas ratios of Ar, $N_2$, $O_2$ are adjusted to control the desired stoichiometry, with the warning that $O_2$ should either be: (a) not be used during deposition of the Ag layer or the second interface layer afterwards, or (b) not used at the beginning of the deposition of the second interface layer, but added into the deposition process after a very thin, 3-5 nm second interface layer has been applied to the Ag layer, The objective is to have the second interface layer, for example an oxide such as $Al_2O_3$, adhere to the silver layer while not exposing the silver surface to excessive $O_2$ before the $Al_2O_3$ deposition, while maintaining substantially all of the $Al_2O_3$ at a stoichiometric or near stoichiometric Al:O ratio. The following are some process criteria used for the stack.

1. If the $Al_2O_3$ is used as a barrier layer, then its initial partial pressures of Ar—$O_2$ gases must be adjusted to create the desired $Al_xO_y$ stoichiometry needed to optimize adhesion at the Al—$Al_xO_y$ interface. The $Al_xO_y$—Ag interface partial pressures are different than the Al—$Al_xO_y$ interface to achieve optimum adhesion so the process must be adjusted towards the end of this barrier layer. The $Al_xO_y$ stoichiometry needed for optimum adhesion at either the Al or Ag interfaces are discussed in the references above. Their partial pressures or gas flow ratios will be dependent on deposition rates, pumping speeds and deposition volumes.

2. Stoichiometry is also critical at the oxide-fluoride interfaces to obtaining optimum adhesion. In the case of oxide material, terminating the layer so that it is a stoichiometric oxide is important; while the fluoride at the interface should be an oxy-fluoride.

3. There are considerations to take into account when using IAD during silver deposition; it is important not to exceed certain ion energies and densities because it can result in trapping Ar into the film. These defects can act as scattering centers which will reduce reflectivity at the lower visible wavelength bands.

4. Bombardment energies and gas ratios should be adjusted to obtain optimum film density. When densifying fluoride materials one has to consider ion energies that will not dissociate the fluorine atoms of the growing film. If this occurs the film will become very unstable and spectral shifting will be observed.

Thus, in one aspect the disclosure is directed to a highly reflective mirror having a for use in the wavelength range of 0.4 µm to 15 µm, the mirror comprising a substrate, a barrier layer on the substrate, a first interface layer on top of the barrier layer, a reflective layer on top of the first interface layer, a second interface layer on top of the reflective layer, at least one tuning layer on top of the second interface layer and at least one protective layer on top of the tuning layer, said mirror having a reflectivity of at least 96% over the wavelength ranges of 0.4 µm to 1.4 µm and 3 µm to 15 µm at an AOI 45°. The mirror has a reflectivity of at least 97% over the wavelength range of 0.4 µm to 1.4 µm and a reflectivity of greater than 98% over the wavelength range 0.4 µm to 1.8 µm at AOI 12°. The substrate that can be used in making the mirror can be selected from the groups consisting of fused silica, fluorine doped fused silica and diamond turned aluminum alloys. In one embodiment, the substrate is 6061-Al alloy. In another embodiment, the substrate is fused silica. The barrier layer is selected from the group consisting of $Si_3N_4$, $SiO_2$, TiAlN, TiAlSiN, $TiO_2$ and DLC. The first interface layer is selected from the group consisting of $Al_2O_3$, $TiO_2$, $Bi_2O_3$ and ZnS, and the metallic materials Ni, Bi, Monel (Ni—Cu), Ti and Pt. The reflective layer is selected from the group consisting of zero valent Ag, Au, Al, Rh, Cu, Pt and Ni. The second interface layer is selected from the group consisting of $SiO_2$, $Si_3N_4$, $Nb_2O_5$, $TiO_2$, $Ta_2O_5$, $Bi_2O_3$, ZnS and $Al_2O_3$. The tuning layer is at least one material selected from the group consisting of $YbF_3$, $YF_3$, $GdF_3$ and $Bi_2O_3$. The protective layer is at least one material selected from the group consisting of $YbF_3$, $YF_3$ and $Si_3N_4$. An exemplary mirror according to the disclosure consists of, from substrate to the top protective layer, fused silica, $Si_3N_4$ or CrN, $Al_2O_3$, Ag, $Al_2O_3$, $YbF_3$, $Nb_2O_5$ and $YbF_3$.

The disclosure is also directed to a method for making a highly reflective mirror, the method comprising the steps of:

providing a substrate selected from the group consisting of aluminum alloys, silica, fused silica, F-doped fused silica, magnesium alloys and titanium alloys;

polishing the substrate to a roughness of less than 10 nm;

applying a barrier layer having a thickness in the range of 10 nm to 100 μm to the surface of the substrate applying a first interface layer having a thickness in the range of 0.2 nm to 50 nm on top of the barrier layer, said thickness being dependent on the interface layer material;

applying a reflecting layer having a thickness in the range of 100 nm to 300 nm on top of the adhesion layer;

applying a second interface layer of at least one selected material, the second interface layer having a thickness in the range of 0.2 nm to 50 nm on top of the reflecting layer in top of the reflecting layer;

applying a tuning layer consisting comprising at least one selected material, the thickness of the tuning layer being dependent on the at least one selected material(s); and applying at least protective layer on top of the tuning layer to thereby form a highly reflective mirror having a reflectance of at least 96% over the wavelength range of 0.4 μm to 15 μm.

In the foregoing method the barrier layer material is selected from the group consisting of $Si_3N_4$, $SiO_2$, TiAlN, TiAlSiN, $TiO_2$, DLC, Al and CrN; the first interface layer material is selected from the group consisting of $Al_2O_3$, $TiO_2$, $Bi_2O_3$ and ZnS, and the metallic materials Ni, Monel (Ni—Cu), Ti and Pt; the reflective layer is a material selected from the group consisting of Ag, Au, Al, Rh, Cu, Pt and Ni; the second interface layer is at least one material selected from the group consisting of $SiO_2$, $Si_3N_4$, $Nb_2O_5$, $TiO_2$, $Ta_2O_5$ and $Al_2O_3$; the tuning layer is at least one material selected from the group consisting of $YbF_3$, $YF_3$, $GdF_3$ and $Bi_2O_3$; and the at least one protective layer is selected from the group consisting of $YbF_3$, $YF_3$, $Si_3N_4$. In an embodiment the reflective layer is silver. In an embodiment the second interface layer comprises $Si_3N_4$—$SiO_2$—$Si_3N_4$.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A method for making a highly reflective mirror, the method comprising the steps of:

providing a substrate selected from the group consisting of aluminum alloys, silica, fused silica, F-doped fused silica, magnesium alloys and titanium alloys;

polishing the substrate to a roughness of less than 10 nm;

applying a barrier layer having a thickness in the range of 100 nm to 50 μm to a surface of the substrate, the barrier layer comprising $Si_3N_4$ or $Si_xN_yO_z$;

applying a first interface layer having a thickness in the range of 0.2 nm to 25 nm on top of the barrier layer, said thickness of the first interface layer being dependent on a material of the first interface layer;

applying a reflecting layer having a thickness in the range of 75 nm to 300 nm on top of the first interface layer;

applying a second interface layer of at least one selected material on top of the reflecting layer, the second interface layer having a thickness in the range of 5 nm to 20 nm;

applying a tuning layer comprising at least one selected material, the thickness of the tuning layer being dependent on the at least one selected material; and applying at least one protective layer on top of the tuning layer.

2. The method according to claim 1 wherein the first interface layer is selected from the group consisting of $Al_2O_3$, $TiO_2$ and ZnS, and the metallic materials Ni, Bi, Monel (Ni—Cu), Ti and Pt.

3. The method according to claim 1, wherein the reflective layer is a material selected from the group consisting of Ag, Au, Al, Rh, Cu, Pt and Ni.

4. The method according to claim 1, wherein the second interface layer is at least one material selected from the group consisting of $SiO_2$, $Si_3N_4$, $Bi_2O_3$, ZnS, $Nb_2O_5$, $TiO_2$, $Ta_2O_5$ and $Al_2O_3$.

5. The method according to claim 1, wherein the tuning layer is at least one material selected from the group consisting of $YbF_3$, $YF_3$, $GdF_3$ and $Bi_2O_3$.

6. The method according to claim 1, wherein the at least one protective layer is selected from the group consisting of $YbF_3$, $YF_3$, $Si_3N_4$.

7. The method according to claim 1, wherein the reflective layer is silver.

8. The method according to claim 1, wherein the second interface layer comprises $Si_3N_4$—$SiO_2$—$Si_3N_4$.

* * * * *

UNITED STATES PATENT AND TRADEMARK OFFICE
CERTIFICATE OF CORRECTION

PATENT NO. : 10,955,594 B2
APPLICATION NO. : 15/916630
DATED : March 23, 2021
INVENTOR(S) : Jason S Ballou et al.

Page 1 of 1

It is certified that error appears in the above-identified patent and that said Letters Patent is hereby corrected as shown below:

On the Title Page

On page 2, in Column 2, item (56), Other Publications, Line 11, delete "Sciecne;" and insert -- Science; --, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*